UNITED STATES PATENT OFFICE.

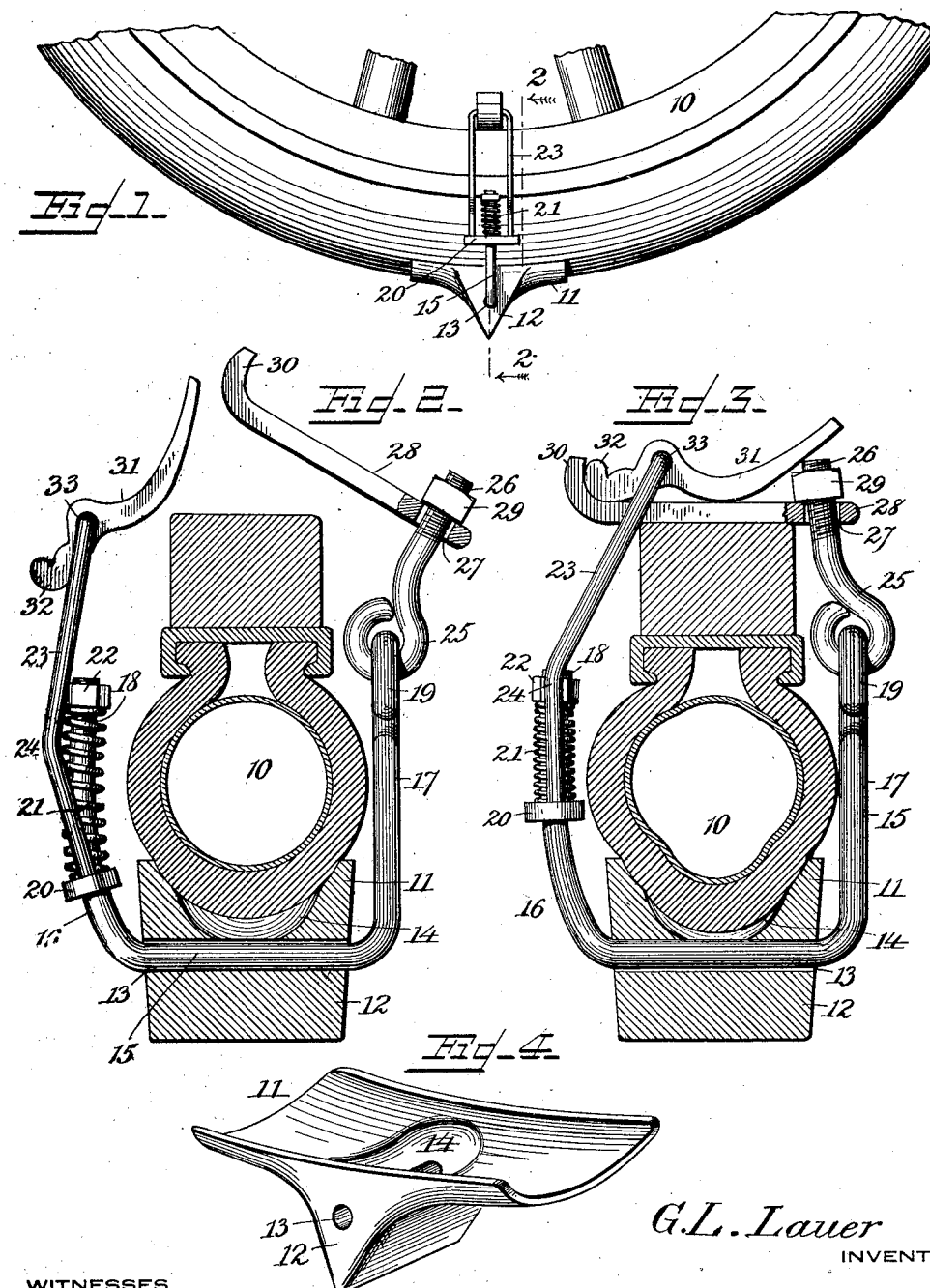

GEORGE L. LAUER, OF BEATRICE, NEBRASKA.

MUD-SHOE.

1,349,514.   Specification of Letters Patent.   Patented Aug. 10, 1920.

Application filed May 3, 1919. Serial No. 294,520.

*To all whom it may concern:*

Be it known that I, GEORGE L. LAUER, a citizen of the United States, residing at Beatrice, in the county of Gage and State of Nebraska, have invented a new and useful Mud-Shoe, of which the following is a specification.

This invention relates to devices popularly known as mud shoes, which are attachments for power-driven vehicle wheels to enable such a vehicle when the wheels become embedded in deep mud to extricate itself under its own power.

A primary object of this invention is to provide such a device which may be quickly and easily attached to and detached from the wheels of all motor-driven vehicles, whether automobiles, motor trucks or motor cycles, or whether provided with solid or pneumatic tires.

Another object is to provide a mud shoe which is adjustable for all sizes of solid or pneumatic tires, and which grips the tires with great tenacity, but without injuring the same in the slightest degree.

Another object of the invention is to produce a mud shoe having an extremely rugged construction, imparting long service under the most exacting conditions.

A further object is to construct the attachment so that it may be folded up when detached and thus occupy less space in the tool box.

Still another object is to provide an attachment which is simple in construction, so that if any part should be broken, the same may be duplicated at small expense by any blacksmith.

With these and other objects in view, this invention consists in the novel arrangement, combination and construction of parts as hereinafter described and claimed.

In the accompanying drawing, in which I have shown the preferred embodiment of the invention:—

Figure 1 is an elevation of a segment of an automobile wheel showing my invention attached;

Fig. 2 is an enlarged vertical sectional view on the line 2—2 of Fig. 1, looking in the direction of the arrow, showing the device partially applied in position;

Fig. 3 is a view similar to Fig. 2, showing the device completely applied;

Fig. 4 is a detail perspective view of the shoe proper.

Referring specifically to the drawing, in which like numerals of reference designate like parts, 10 indicates a portion of an auomtobile wheel having a pneumatic tire applied thereto. The mud shoe 11, which is preferably made of cast iron, is pivotally attached to and clamped on the wheel by a clamping means to be presently described, said means extending from the mud shoe 11 on either side of the tire and rim of the wheel and over the inner face of the rim. Preferably, several of the mud shoes are attached to the rear or driving wheels of the vehicle, although for simplicity but one is shown in the drawing. The inner or tire-engaging face of the mud shoe 11 is preferably made concave with respect to both its longitudinal and transverse axes, and is so shown. This concavity enables the shoe to conform to the tread of the tire, thus bringing about a closer connection between the shoe and the wheel. To insure the greatest strength at the points of most strain and wear, the shoe is made of least thickness at its ends and of increasing thickness as the transverse axis is approached.

Midway between the ends and extending outwardly from the shoe, is a heavy V-shaped integral tooth or spur 12, which constitutes a positive anti-slipping means. The spur 12 is made with a knife-edge, so that it will bite deep into stiff and heavy clay. Running through the base of the spur 12 is a bore or passage 13, which extends transversely with respect to the shoe. From the inner or tire-engaging face of the shoe opposite the spur extends a recess 14, which is countersunk into the said face, and has its bottom intersecting the bore 13, thus exposing the bore at the tire-engaging face of the mud shoe. Besides reducing the weight, this recess provides a grip for the tire, especially if of the pneumatic type. When the mud shoe is applied to pneumatic tires, the air pressure will force the outer surface of the tire part way down into the recess; and if the tire has the corrugations or knobs peculiar to the so-called "non-skid" type, one or more of these corrugations will be thrust down into the recess, thus adding to the grip of the shoe on the tire. The recess 14 has a further advantage which will be later explained.

Through the bore 13 is passed a substantially U-shaped clamping member 15, which is of a diameter less than that of the bore, so that it will turn freely therein. This clamping member is preferably made from a long eye-bolt bent twice in the same plane to form arms 16 and 17. Arm 16 is curved with respect to the main body of said member 15, and is threaded on the end as indicated at 18, while the arm 17 has an eye 19 at its end, and extends at right angles to the said member 15. It will be understood that the shoe 11 is pivotally mounted on the U-shaped member 15, and freely swings between the arms of the latter.

Slidably mounted on the arm 16 is a ring or block 20. Mounted on said arm 16 between said block 20 and the end thereof, is a coil or spiral spring 21, one end of which bears against the block 20. A nut 22 is screwed on the threads 18 of the arm 16, and constitutes a tensioning nut, enabling the spring 21 to bear with the desired tension against the slidable block 20.

Rigidly attached to block 20 is a yoke 23, substantially an elongated U in shape, (Fig. 1) with a cross arm at its inner end. The yoke 23 is bent inwardly with respect to the shoe at a point intermediate of its ends, as indicated at 24.

Linked with an eye 19 of arm 17 is the eye bolt 25, the end 26 of which is threaded and is passed through a hole 27 in a bearing plate 28, said plate being secured to the eye bolt 25 by a nut 29 screwed onto the threaded end 26. The hole 27 is larger in diameter than the eye bolt; hence the plate has considerable freedom of movement upon the eye-bolt 25.

At the opposite end from the hole 27, the plate 28 is given a bend 30 which is shaped to coöperate with a clamping lever 31. The clamping lever 31 is curved at its engaging end 32, to coöperate with the bend 30 of the plate 28, and being pivotally mounted on the cross arm of the yoke 23, as shown at 33, is able to turn freely about the same. On the other side of the pivot, the lever 31 is curved in such a way that its free end is spaced away from the rim when it is in clamping position.

The mud shoe is applied to a wheel, as shown in Fig. 2, the tire being seated against the inner face of the shoe 11, and the two arms 16, 17, extending on opposite sides of the tire and rim. The plate 28 is passed over the inner peripheral surface of the rim and laid flat upon the same. The clamping lever 31 has its end 32 engaged with the bend 30 of the plate, and the lever is then swung against the plate, as shown in Fig. 3, thus clamping the shoe upon the tire.

From the foregoing description, it will be appreciated that the present device is adaptable not only to solid and pneumatic tires, but to various sized and "over-sized" tires, both plain tread and "non-skid" tread. The device may be adjusted by screwing down nut 29, whereupon the plate 28 is brought closer to the shoe, and by screwing down the tension nut 22, the spring 21 is forced against the block 20, thus bringing the clamping lever 31 closer to the shoe. It is obvious that when the clamping lever and the plate are forced closer to the shoe, the device is adapted to fit over a smaller tire and rim. It is also obvious that when the user once adjusts the two nuts as aforesaid, he will not need to make the adjustment a second time, unless he desires to use the mud shoe on a wheel smaller or larger than the one previously adjusted for. Finally, it is clear that the use of the spring 21, in combination with the clamping lever 31, not only makes the necessary adjustments fewer, but acts to clamp the device upon a wheel with a bull-dog grip.

The member 15 and the yoke 23 are circular in cross-section and thus cannot chafe or injure the tire when clamped about it, while the large area of the inner face of the shoe 11 presents a large frictional surface to the tire, does not bind the tire in any one place, and makes it impossible to shift or change the position of the mud shoe upon the wheel.

This invention may be carried for emergency use only, when it will be attached to the wheels only after the vehicle is actually stuck in the mud, or it may be used on heavy roads as a preventive against stalling.

A mud shoe is of course subjected to very hard usage. The constant moisture and mud might clog up the bore 13 with rust and dirt, and if the shoe were laid aside for a long time exposed to dampness, the U-shaped member 15 might rust tight into the bore 13. In such an event, a little oil or grease introduced through the recess 14 would quickly put the parts in working order again.

When the mud shoe is to be put away, it can be partly folded up by bringing the arms of the U-shaped member into substantial alinement with the shoe, and by laying the eye bolt, plate and clamping lever against either face of the shoe.

While the mud shoe is made preferably of iron, other metals, such as aluminum or the various commercial alloys could be employed.

While I have herein described with particularity the various features of construction of the mud shoe, I desire it understood that changes may be made in the form, size, proportion and details of construction, within the scope of the appended claims, without departing from the spirit or scope of this invention.

What is claimed is—

1. A mud shoe comprising a tire-engaging plate having a traction spur formed integrally with the plate, with a bore extending through the plate from one side to the other, said plate having a concave inner face and a recess countersunk in said face and exposing the bore, and clamping means mounted in the bore for holding the plate against the tire.

2. A mud shoe for a vehicle wheel consisting of a tire-engaging plate having a traction spur formed integrally therewith, and a bore running through the plate, a substantially U-shaped member pivotally mounted in the bore, said member having two arms each extending inwardly along either side of the plate, and adjustable clamping means attached to said arms for holding the shoe onto the wheel.

3. A mud shoe for a vehicle wheel consisting of a plate having traction means, a substantially U-shaped member pivotally connected to the plate having two arms, spring tensioning means mounted on one of said arms, and a clamping mechanism having a portion connected with said tensioning means and another portion connected with the other arm of said member to hold said plate onto the wheel.

4. A mud shoe for a vehicle wheel consisting of a plate having traction means, a substantially U-shaped member pivotally connected to the plate having two arms, a block slidably mounted on one of said arms, spring tensioning means mounted on said arm and bearing against said block, an adjusting nut to regulate the pressure of said tensioning means against the block, and a clamping mechanism connected with said block and the other arm of said member to hold said plate onto the wheel.

5. A mud shoe for a vehicle wheel consisting of a plate having traction means, a substantially U-shaped member pivotally mounted on said plate, said member having two arms, one of which is curved, a block slidably mounted on the curved arm, a spring mounted on said arm and bearing against the block, a nut for adjusting the spring pressure against said block, and a clamping mechanism connected with the block and the other arm to hold said shoe onto the wheel.

6. A mud shoe for a vehicle wheel consisting of a plate having traction means, a substantially U-shaped member pivotally mounted in the plate, said member having two arms one of which is curved, a block slidably mounted on the curved arm, a yoke rigidly connected to the block, adjustable spring tensioning means mounted on said curved arm and bearing against said block, and a clamping device connected to the other arm of said member and said yoke for holding the shoe onto the wheel.

7. A mud shoe for a vehicle wheel comprising a plate having traction means, a substantially U-shaped member pivotally mounted in the plate, said member having arms, a yoke slidably mounted on one arm, a clamping lever pivotally mounted on the end of said yoke, and means connected with the other arm for engagement with the clamping lever to secure the shoe onto the wheel.

8. A mud shoe for rubber tired vehicle wheels comprising a plate having traction means, a substantially U-shaped member pivotally mounted in the plate, a clamping means adapted to be passed over and bear against the rim of the wheel, and two distinct coöperating connecting means between the clamping means and the plate, located on either side of the plate, one of which means is resilient, for adjusting the shoe to various sizes and types of tires.

9. A mud shoe comprising a plate having traction means and a clamping device for securing said plate to the tire of a wheel, said device including a clamping lever, a plate bearing against the rim of the wheel, and spring tensioning means.

10. A mud shoe comprising a plate having traction means, a member connected to the plate and extending inwardly toward the rim of the wheel, a clamping lever, a plate bearing against the inner side of the rim, and means for flexibly connecting said lever and plate with said member, said means including a spring to impart tension thereto.

11. A mud shoe comprising a plate having traction means, a member connected with the plate and extending inwardly toward the rim of the wheel, spring tensioning means mounted upon said member, an eye bolt having a link connection with said member, a plate connected with said eye bolt and a clamping lever connected to said spring tensioning means and bearing upon said plate and operating to hold said plate against the rim of the wheel.

In testimony that I claim the foregoing as my own, I have hereto affixed my signature in the presence of two witnesses.

GEORGE L. LAUER.

Witnesses:
 PETER PENNER,
 GEO. MUDGE.